US006649666B1

(12) United States Patent
Read et al.

(10) Patent No.: US 6,649,666 B1
(45) Date of Patent: Nov. 18, 2003

(54) PROPYLENE POLYMER COUPLING AND FOAMS

(75) Inventors: Michael D. Read, Midland, MI (US); Kevin R. Hughes, Hemlock, MI (US); Jin Zhao, Midland, MI (US); Thomas J. Styranec, Midland, MI (US); Eung Kyu Kim, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/153,058

(22) Filed: May 21, 2002

(51) Int. Cl.[7] .................................................. C08J 9/00
(52) U.S. Cl. ........................ 521/95; 521/79; 521/142; 521/143
(58) Field of Search ........................ 521/95, 142, 143, 521/79

(56) References Cited

U.S. PATENT DOCUMENTS

| 3,282,864 A | * | 11/1966 | Bost et al. |
| 3,298,975 A | * | 1/1967 | Field et al. |
| 3,341,480 A | * | 9/1967 | Field |
| 3,389,198 A | * | 6/1968 | Taber |
| 3,645,992 A | | 2/1972 | Elston |
| 4,323,528 A | | 4/1982 | Collins |
| 4,694,025 A | * | 9/1987 | Park |
| 4,701,432 A | | 10/1987 | Welborn, Jr. |
| 4,714,716 A | * | 12/1987 | Park |
| 4,824,720 A | | 4/1989 | Malone |
| 4,916,198 A | | 4/1990 | Scheve et al. |
| 4,935,397 A | | 6/1990 | Chang |
| 4,937,299 A | | 6/1990 | Ewen et al. |
| 4,937,301 A | | 6/1990 | Chang |
| 5,055,438 A | | 10/1991 | Canich |
| 5,272,236 A | | 12/1993 | Lai et al. |
| 5,278,272 A | | 1/1994 | Lai et al. |
| 5,527,573 A | | 6/1996 | Park et al. |
| 6,117,918 A | * | 9/2000 | Chaudhary et al. |
| 2002/0052450 A1 | | 5/2002 | Walters et al. |

FOREIGN PATENT DOCUMENTS

| EP | 0 260 999 | 3/1988 |
| EP | 0 879 844 A1 | 11/1998 |
| EP | 0 129 368 B2 | 4/2002 |
| WO | WO 90/07526 | 7/1990 |
| WO | WO 99/10424 | 8/1999 |
| WO | WO 00/15700 | 3/2000 |

OTHER PUBLICATIONS

Modern Plastics Encyclopedia/89, Oct. 1988, vol. 65, No. 11, p. 86–92.
In–Situ Rheology Modification of Polymers, U.S. Provisional application No. 60/057,713, Filed Aug. 27, 1997.

* cited by examiner

Primary Examiner—Morton Foelak

(57) ABSTRACT

The invention includes a process for providing a coupled propylene polymer foam. The invention also includes any composition comprising a product formed by the process of the invention and any article formed from such a composition.

22 Claims, No Drawings

PROPYLENE POLYMER COUPLING AND FOAMS

BACKGROUND OF THE INVENTION

Polypropylene can offer good impact properties because it is a semi-crystalline polymer which has a glass transition temperature substantially below room temperature. In addition, polypropylene can offer good temperature stability and high chemical resistance. However, until now, the production of polypropylene foams has been limited because of its low melt strength and melt elasticity and this makes it difficult to be foamed in comparison to the other plastics. If the melt strength and the melt elasticity are too weak, as in the case of polypropylene, the cell walls separating the bubbles will be too weak to bear the extensional force that is generated during the foaming process and the bubbles will rupture very easily. As a result, foamed polypropylene products are generally characterized by high open cell content, which makes them unsatisfactory in many applications.

Branched or lightly crosslinked polymers including polypropylene, such as may be obtained by chemical or irradiation branching or lightly crosslinking, are disclosed in U.S. Pat. Nos. 4,714,716 and 5,527,573. In co-pending U.S. patent application Ser. No. 09/133,576 filed Aug. 13, 1998 and WO-99/10424 in-situ rheology modification of polyolefins is disclosed as applied to, among others, polypropylenes resulting in polypropylenes having advantageous melt processing properties. Foams are mentioned among the possible end uses or applications of such rheology-modified propylene polymers.

There is a continuous demand for propylene polymer foams of a relatively high closed cell content, which do not suffer from the bubble stability problem generally experienced with polypropylene foams. The foams desirably are capable of being manufactured at high foam production rates on conventional foaming equipment while using a relatively low amount of blowing agent.

SUMMARY OF THE INVENTION

The present invention is a process to produce such improved propylene polymer foams. It has now been found that treatment of a propylene polymer, used as a feedstock for foam, with poly(sulfonyl azide) helps to retain or improve processability while subsequently building the molecular weight of the propylene polymer, enhancing its melt strength and improving its extensional properties. More preferably, by treating the propylene polymer starting materials by the process of the invention, one achieves at least one of greater throughput of polymer into foam (e.g., in pounds per hour) or lower density than with untreated starting material in the same foaming process while retaining equivalent or better crush strength or flexibility or both.

The invention includes a process for preparing a foam comprising the steps of: (i) introducing into a melt processing device (a) a propylene polymer and (b) a coupling amount of a poly(sulfonyl azide) and optionally an additional component such as (c) a nucleating agent, an additional thermoplastic polymer, a filler, a stabilizer, or mixtures thereof, forming a propylene polymer admixture wherein the additional component may be introduced before, during or after the coupling of the propylene polymer, (ii) exposing the propylene polymer admixture to a temperature sufficient to result in coupling of the propylene polymer forming a molten coupled propylene polymer composition, (iii) introducing a blowing agent before, during or after the coupling of the propylene polymer under a first pressure which maintains the blowing agent in the molten coupled propylene polymer composition, (iv) cooling the molten coupled propylene polymer composition comprising the blowing agent, (v) processing the molten coupled propylene polymer composition into a zone having a second pressure which allows for the blowing agent to escape from the molten coupled propylene polymer composition and (vi) forming a resulting foam. Preferably, the amount of poly(sulfonyl azide) is from about 10 parts per million to about 5 parts per hundred based on the weight of the propylene polymer; the melt process temperature is between about 200° C. and about 255° C.; the melt processing device is an extruder; or a combination thereof.

The poly(sulfonyl azide) preferably has a structure X-R-X wherein each X is $SO_2N_3$ and R represents an unsubstituted or inertly substituted hydrocarbyl, hydrocarbyl ether or silicon-containing group; the poly(sulfonyl azide) has sufficient carbon, oxygen or silicon, atoms to separate the sulfonyl azide groups sufficiently to permit a facile reaction between the propylene polymer and the sulfonyl azide; R includes at least one aryl group between the sulfonyl groups; or a combination thereof.

Preferably, the resulting foam has a density of equal to or less than about 50 pounds per cubic foot and equal to or greater than about 0.6 pounds per cubic foot; a cell size of equal to or less than about 8 millimeters and equal to or greater than about 0.1 millimeters in diameter; or a combination thereof.

The invention also includes any composition comprising a foamed product formed by a process of the invention and any article formed from such a composition. Preferred articles are an automotive headliner, an automotive door liner, an automotive energy absorption counter measure, an automotive bumper, comfort cushioning foam, thermal insulation foam, sound insulation foam, building foam, construction foam, or packaging foam.

DETAILED DESCRIPTION OF THE INVENTION

The propylene polymer suitable for use in this invention is well known in the literature and can be prepared by known techniques. In general, the propylene polymer is in the isotactic form, although other forms can also be used (e.g., syndiotactic or atactic). The propylene polymer used for the present invention is preferably a homopolymer of polypropylene, a copolymer, for example, a random or block copolymer, of propylene and an alpha-olefin, preferably a ethylene, or $C_4$ to $C_{20}$ alpha-olefin or a random terpolymer of propylene and two or more monomers selected from ethylene and $C_4$ to $C_{20}$ alpha-olefins. The alpha olefins may be linear or branched, but are preferably linear. The alpha-olefin is present in the propylene polymer of the present invention in an amount less than or equal to about 7 percent by mole, preferably less than or equal to about 5 percent, even more preferably less than or equal to about 3 percent and most preferably less than or equal to about 1 percent by mole.

Examples of the $C_4$ to $C_{20}$, alpha-olefins for constituting the propylene and alpha-olefin copolymer include 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1- pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified it is generally on position 3 or higher of the alkene.

The propylene polymer of the present invention can be prepared by various processes, for example, in a single stage or multiple stages, by such polymerization method as slurry polymerization, gas phase polymerization, bulk polymerization, solution polymerization or a combination thereof using a metallocene catalyst or a so-called Ziegler-Natta catalyst, which usually is one comprising a solid transition metal component comprising titanium. Particularly a catalyst consisting of, as a transition metal/solid component, a solid composition of titanium trichoride which contains as essential components titanium, magnesium and a halogen; as an organometalic component an organoaluminum compound; and if desired an electron donor. Preferred electron donors are organic compounds containing a nitrogen atom, a phosphorous atom, a sulfur atom, a silicon atom or a boron atom, and preferred are silicon compounds, ester compounds or ether compounds containing these atoms.

Propylene polymers are commonly made by catalytically reacting propylene in a polymerization reactor with appropriate molecular weight control agents. Nucleating agent is added after the reaction is completed in order to promote crystal formation. The polymerization catalyst should have high activity and be capable of generating highly tactic polymer. The reactor system must be capable of removing the heat of polymerization from the reaction mass, so the temperature and pressure of the reaction can be controlled appropriately.

A good discussion of various polypropylene polymers is contained in *Modern Plastics Encyclopedia*/89, mid October 1988 Issue, Volume 65, Number 11, pp. 86–92, the entire disclosure of which is incorporated herein by reference.

As used herein, the Mw of a polymer means the weight average molecular weight of the polymer while Mn means the number average molecular weight. In addition, in the present compositions, the increased high molecular weight polymer is reflected in the Mz value of the resin. The Mz of a resin is believed to more accurately show the effect of high molecular weight constituents of a resin. For the purpose of defining the present invention, the molecular weight data for components having weight average molecular weights up to about 700,000 is determined by gel permeation chromatography (GPC). The GPC analysis is conveniently achieved with a GPC column which is linear from Mw's of about 600 to about 2,000,000. In the case of the very high average molecular weight polymers (above 700,000 and higher), the molecular weight is accurately determined from the solution viscosity of a 10 percent solution of the polymer in toluene. Unless noted otherwise, molecular weight values are given as weight average molecular weight (Mw).

The ratio of the weight average and number average molecular weights, Mw/Mn, often called the dispersion index or the molecular weight distribution, is an indication of the broadness or narrowness of the distribution of molecular weights; the larger the number given by this ratio, the broader the molecular weight distribution. The molecular weight distribution can also be shown graphically by plotting the log of the molecular weight of very small polymer fractions on the X-axis, against the percentage of the total composition weight that such molecular weight polymer makes up, on the Y-axis. Determining this data using GPC is within the skill in the art and such plots are called GPC curves. In general, the GPC curves for polymers are single-peaked, bell-shaped curves, the relatively broader or narrower shape of the "bell" indicating broad or narrow distribution as used herein, generally refers to the shape of the curves obtained by GPC analysis of such polymers which is reflected in the Mw/Mn ratios. Preferably the molecular weight distribution is equal to or less than about 20, more preferably equal to or less than about 15, most preferably equal to or less than about 10. The molecular weight distribution is preferably equal to or greater than about 2, more preferably equal to or greater than about 3.5 and most preferably equal to or greater than about 5.

Conveniently, the propylene polymer has a melt flow rate (MFR) of equal to or greater than about 0.01 gram/10 minutes (g/10 min.), preferably equal to or greater than about 0.05 g/10 min., more preferably equal to or greater than about 0.1 g/10 min. and even more preferably equal to or greater than about 0.5 g/10 min. The melt flow rate for propylene polymer useful herein is generally equal to or less than about 200 g/10 min., preferably equal to or less than about 100 g/10 min., more preferably equal to or less than about 75 g/10 min., even more preferably equal to or less than about 50 g/10 min., and most preferably equal to or less than about 35 g/10 min. Unless otherwise stated, melt flow rate is determined according to ASTM D 1238 at 230° C. and an applied load of 2.16 kilogram (kg).

The propylene polymer and propylene copolymer resins may, if desired, be high melt strength resins prepared by a branching method known in the art. The methods include irradiation with high energy electron beam (U.S. Pat. No. 4,916,198), coupling with an azidofunctional silane (U.S. Pat. No. 4,714,716) and reacting with a peroxide in the presence of a multi-vinyl functional monomer (EP 879,844-A1), the disclosures of which are incorporated herein by reference.

In general, (a) the propylene polymer is employed in an amount of equal to or greater than about 50 parts by weight, preferably equal to or greater than about 60 parts by weight, more preferably equal to or greater than about 70 parts by weight, most preferably equal to or greater than about 75 parts by weight based on the combined weight of all the polymers in the propylene polymer composition. In general, the thermoplastic polymer is used in amounts less than or equal to about 99.99 parts by weight, preferably less than or equal to about 99.9 parts by weight, more preferably less than or equal to about 99 parts by weight, even more preferably less than or equal to about 95 parts by weight, and most preferably less than or equal to about 85 parts by weight based on the combined weight of all the polymers in the propylene polymer composition.

For the purposes of coupling, the propylene polymer is reacted with (b) a poly(sulfonyl azide) compound capable of insertion reactions into C=H bonds. Such poly(sulfonyl azide) compounds are disclosed in U.S. 2002/0,052,450, which is hereby incorporated by reference. Poly(sulfonyl azide) compounds having at least two sulfonyl azide groups ($-SO_2N_3$) capable of C—H insertion under reaction conditions are referred to herein as coupling agents. Preferably the poly(sulfonyl azide)s have a structure X-R-X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polymer and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 30, most preferably less than about 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction(s) or desired properties of the resulting coupled polymers. Such groups include fluorine, aliphatic or aromatic ether, and siloxane as well as sulfonyl azide groups when more than two polymer chains are to be joined. Suitable structures include R as aryl, alkyl, alkaryl, arylalkyl, silane, siloxane or heterocyclic groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group has more than one ring, as in the case of naphthylene bis(sulfonyl azides). Poly(sulfonyl)azides include such compounds as 1,5-pentane bis(sulfonlazide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide and bis(4-sulfonyl azidophenyl)methane, and mixtures thereof.

Sulfonyl azides are conveniently prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used.

To achieve measurable rheology modification, the amount of poly(sulfonyl azide) is preferably equal to or greater than about 10 parts per million (ppm) by weight, more preferably equal to or greater than about 100 ppm, even more preferably equal to or greater than about 200 ppm, and most preferably 300 ppm, wherein ppm are based on the weight of the propylene polymer. The amount of poly(sulfonyl azide) is equal to or less than about 5 parts per hundred (pph) by weight, preferably equal to or less than about 2 pph, more preferably equal to or less than about 1 pph, even more preferably equal to or less than about 0.1 pph and most preferably equal to or less than 0.05 pph by weight based on the weight of the propylene polymer.

Polymers coupled according to the practice of the invention have Mw increased from that of the starting material by an amount equal to or greater than about 2 percent, preferably equal to or greater than about 5 percent, more preferably equal to or greater than about 10 percent or Mz increased by an amount equal to or greater about 4 percent, preferably equal to or greater than about 10 percent, most preferably equal to or greater than about 20 percent. Conveniently coupled polymers have Mw less than about 400 percent greater, preferably less than about 300 percent, more preferably less than about 150 percent, most preferably less than about 100 percent greater than that of the starting polymer, or Mz correspondingly increased equal to or less than about 600 percent, more preferably equal to or less than about 300 percent, most preferably equal to or less than about 200 percent. Preferred coupled propylene polymers thus have molecular weights equal to or greater than about 60,000, more preferably equal to or greater than about 100,000 most preferably equal to or greater than about 150,000. Conveniently these preferred coupled polymers have Mw equal to or less than about 700,000 more preferably equal to or less than about 500,000, more preferably equal to or less than about 450,000, most preferably equal to or less than about 400,000.

Blowing agents, sometimes referred to as foaming agents, useful in making the foam according to the present invention include inorganic blowing agents, organic blowing agents, chemical blowing agents and mixtures thereof. Suitable inorganic blowing agents include carbon dioxide, nitrogen, argon, water, air, nitrogen, and helium. Organic blowing agents include aliphatic hydrocarbons having 1–9 carbon atoms, aliphatic alcohols having 1–4 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), 1,1,2,2-tetrafluoromethane (HFC-134), pentafluoroethane, difluoromethane, perfluoroethane, 2,2-difluoropropane, 1,1,1-trifluoropropane, perfluoropropane, difluoropropane, perfluorobutane, perfluorocyclobutane. Partially halogenated chlorocarbons and chlorofluorocarbons for use in this invention include methyl chloride, methylene chloride, dichloropropane, ethyl chloride, 1,1,1-trichloroethane, 1,1-dichloro-1-fluoroethane (HCFC-141 b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semicarbazide, barium azodicarboxylate, N,N'-dimethyl-N,N'-dinitrosoterephthalamide, and trihydrazino triazine.

Though the present process optionally employs any known blowing agent, preferred blowing agents are volatile blowing agents having a boiling point temperature range of −50° C. to +50° C. and include, but are not limited to aliphatic hydrocarbons such as n-pentane, isopentane, neopentane, isobutane, n-butane, propane and the like; fluorochlorinated hydrocarbons such as dichlorotetrafluoroethane, trichlorotrifluoroethane, trichloromonofluoromethane, dichlorodifluoromethane, dichloromonofluoromethane and the like; and so on. Among them, the non-fully halogenated hydrocarbons are preferable in point of environmental considerations. Particularly preferred among the non-fully halogenated hydrocarbons are partially or fully fluorinated hydrocarbons and non-fully halogenated fluoro-chlorinated hydrocarbons. Examples of these include 1-chloro-1-fluoroethane and 1,1-difluoroethane. Particularly preferred among the aliphatic hydrocarbons are n-butane, isobutane and isobutane/n-butane mixtures. Also contemplated are combinations of these blowing agents with one or more of carbon dioxide, water, nitrogen or argon.

In general, incorporation of a greater amount of blowing agent results in a higher expansion ratio (the term "expansion ratio" herein referred to means the ratio (density of resin)/(density of expanded product)) and thus a lower foam density. However care must be taken not to incorporate an amount of blowing agent that causes a separation between resin and blowing agent during the foam conversion process. When this happens, "foaming in the die" occurs, the surface of the expanded product becomes rough and unacceptable expanded product is obtainable. The amount of blowing agent incorporated into the molten propylene polymer composition to make a foam-forming molten propylene polymer composition comprising a blowing agent is preferably equal to or greater than about 0.01 gram-mole per 100 grams of the combined weight of all the polymers in the propylene polymer composition, preferably equal to or greater than about 0.05 gram-mole per 100 grams, more preferably equal to or greater than about 0.06 gram-mole per 100 grams and most preferably equal to or greater than about 0.1 gram-mole per 100 grams of the combined weight of all the polymers in the propylene polymer composition. The amount of blowing agent incorporated into the molten propylene polymer composition to make a foam-forming molten propylene polymer composition comprising a blowing agent is preferably equal to or less than about 0.5 gram-mole per 100 grams of the combined weight of all the polymers in the propylene polymer composition, preferably equal to or less than about 0.4 gram-mole per 100 grams and most preferably equal to or less than about 0.3 gram-mole per 100 grams of the combined weight of all the polymers in the propylene polymer composition. For example, for isobutane blowing agent in a propylene polymer composition comprising propylene polymer as the only polymer, 0.17 gram-moles per 100 grams propylene polymer equals 10 pph isobutane based on the weight of the propylene polymer.

A nucleating agent is optionally added to control the size of foam cells. Preferred nucleating agents include inorganic substances such as calcium carbonate, talc, clay, titanium dioxide, silica, barium stearate, calcium stearate, diatomaceous earth, mixtures of citric acid and sodium bicarbonate, and the like. The amount of nucleating agent employed advantageously is an amount equal to or greater than about 0.01 pph by weight, preferably equal to or greater than about 0.05 pph, more preferably equal to or greater than about 0.1 pph and most preferably equal to or greater than about 0.5 pph based on the combined weight of all the polymers in the propylene polymer composition. The amount of nucleating agent employed advantageously is an amount equal to or less than about 5 pph by weight, preferably equal to or less than about 3 pph and more preferably equal to or less than about 1 pph based on the combined weight of all the polymers in the propylene polymer composition.

In general, an increased amount of nucleating agent gives a smaller diameter of cell. However, if the amount exceeds 5 pph, agglomeration or insufficient dispersion of nucleating substance occurs, so that the diameter of the cell becomes greater. On the contrary if the amount is less than 0.01 pph, the nucleating action is too feeble to decrease the diameter of the cells.

Various additional components are optionally incorporated in the foam structure such as inorganic fillers, such as, but not limited to talc, clay, wollastonite, mica, glass or a mixture thereof; pigments; antioxidants; thermal stabilizers; acid scavengers; ultraviolet absorbers; neutralizers; slip agents; antiblock agents; antistatic agents; clarifiers; waxes; thermoplastic resins; flame retardants; processing aids; extrusion aids; and other additives within the skill in the art used in combination or alone. Effective amounts are known in the art and depend on parameters of the composition and conditions to which they are exposed.

One or more other thermoplastic polymer may be blended with the propylene polymer in an amount such that the desired foam properties are achieved. Examples of these include a second propylene polymer, high-, low- and ultra-low density polyethylene, ethylene-vinyl aromatic interpolymer, polybutadiene, ethylene-vinyl acetate copolymer, styrene-butadiene rubber, ethylene-ethyl acetate copolymer, ethylene acrylic acid copolymer, polyolefin elastomer and the like. The additional one or more thermoplastic polymer may be mixed into the abovementioned propylene polymer, so long as the latter is the main component in the resulting mixture and the mixture is preferably of uniform quality.

Suitable polyolefin elastomers for use in the present invention comprise one or more of ethylene and $C_3$ to $C_2$, alpha-olefins in polymerized form, having a glass transition temperature ($T_g$) less than 25° C., preferably less than 0C. $T_g$ is the temperature or temperature range at which a polymeric material shows an abrupt change in its physical properties, including, for example, mechanical strength. $T_g$ can be determined by differential scanning calorimetry. Examples of the types of polymers from which the present polyolefin elastomers are selected include polyethylene and copolymers of alpha-olefins, such as ethylene and propylene, ethylene and 1-butene, ethylene and 1-hexene or ethylene and 1-octene copolymers, and terpolymers of ethylene, propylene and a diene comonomer such as hexadiene or ethylidene norbornene.

A preferred polyolefin elastomer is one or more substantially linear ethylene polymer or one or more linear ethylene polymer (S/LEP), or a mixture of one or more of each. Both substantially linear ethylene polymers and linear ethylene polymers are well known. Substantially linear ethylene polymers and their method of preparation are fully described in U.S. Pat. No. 5,272,236 and U.S. Pat. No. 5,278,272 and linear ethylene polymers and their method of preparation are fully disclosed in U.S. Pat. No. 3,645,992; U.S. Pat. No. 4,937,299; U.S. Pat. No. 4,701,432; U.S. Pat. 4,937,301; U.S. Pat. No. 4,935,397; U.S. Pat. No. 5,055,438; EP 129,368; EP 260,999; and WO 90/07526 the disclosures of which are incorporated herein by reference.

If an additional thermoplastic polymer is present, it is present in an amount equal to or greater than about 1 pph by weight, preferably equal to or greater than about 5 pph, most preferably equal to or greater than about 10 pph by weight based on the combined weight of all the polymers in the propylene polymer composition. If one or more additional polymer is present, it is present in an amount equal to or less than 50 pph by weight, preferably equal to or less than about 30 pph and most preferably equal to or less than 25 pph by weight based on the combined weight of all the polymers in the propylene polymer composition.

For coupling, the propylene polymer admixture is exposed to a temperature, hereinafter, melt process temperature, sufficient to result in coupling of the propylene polymer forming a molten coupled propylene polymer composition. Preferably, the sulfonyl azide is admixed with the polymer and heated to at least the decomposition temperature of the sulfonyl azide. By decomposition temperature of the azide it is meant that temperature at which the azide converts to the sulfonyl nitrene, eliminating nitrogen and heat in the process, as determined by differential scanning calorimetry (DSC). The poly(sulfonyl azide) begins to react at a kinetically significant rate (convenient for, use in the practice of the invention) at temperatures of about 130° C. and is almost completely reacted at about 160° C. in a DSC (scanning at 10° C./min). Accelerating rate calorimetry (ARC) (scanning at 2° C./hr) shows onset of decomposition is about 100° C. Extent of reaction is a function of time and temperature. At the low levels of azide used in the practice of the invention, the optimal properties are not reached until the azide is essentially fully reacted. Temperatures for use in the practice of the invention are also determined by the softening or melt temperatures of the polymer starting materials. For these reasons, the melt processing temperature is advantageously greater than about 80° C., preferably greater than about 130° C., more preferably greater than about 150° C., even more preferably greater than about 160° C., even more preferably greater than about 180° C., even more preferably greater than about 200° C. and most preferably greater than about 220° C. Similarly, the coupling temperature is preferably less than about 285° C., more preferably less than about 275° C. most preferably less than about 255° C.

Preferred times at the desired decomposition temperatures are times that are sufficient to result in reaction of the coupling agent with the polymer(s) without undesirable thermal degradation of the polymer matrix. Preferred reaction times in terms of the half life of the coupling agent, that is the time required for about half of the agent to be reacted at a preselected temperature, which half life is determinable by DSC is about 5 half lives of the coupling agent. Conveniently the propylene polymer and poly(sulfonyl azide) are processed for at least about 5 seconds, more preferably at least about 15 seconds, most preferably at least about 30 seconds, but preferably less than about 2 hours, more preferably less than about 30 minutes most preferably less than about 15 minutes. In the case of a bis(sulfonyl azide), for instance, the reaction time is preferably equal to or greater than about 1 minute at 200° C.

Preferred processes include at least one of (a) dry blending the coupling agent with a polymer, preferably a propylene polymer, and optionally additional components, such as stabilizers, preferably to form a substantially uniform admixture and adding this mixture to melt processing equipment, e.g. a melt extruder to achieve the coupling reaction, at a temperature of at least the decomposition temperature of the coupling agent; (b) introducing, e.g. by injection, a coupling agent in liquid form, e.g. dissolved in a solvent therefor or in a slurry of coupling agent in a liquid, into a device containing polymer, preferably softened, molten or melted polymer, but alternatively in particulate form, in solution or dispersion, more preferably in melt processing equipment; (c) forming a first admixture of a first amount of a first polymer (e.g., the same or different propylene polymer as to which the coupling agent is being added or any of the other thermoplastic polymer mentioned hereinabove) and a coupling agent, advantageously at a temperature less than about the decomposition temperature of the coupling agent, preferably by melt blending, and then forming a second admixture of the first admixture with the propylene polymer (for example a concentrate of a coupling agent admixed with at least one polymer and optionally other additives, is conveniently admixed into the propylene polymer or combination thereof optionally with other additives, to modify the propylene polymer); (d) feeding at least one coupling agent, preferably in solid form, more preferably finely comminuted, e.g. powder, directly into softened or molten polymer, e.g. in melt processing equipment, e.g. in an extruder; or combinations thereof. Among processes (a) through (d), processes (a) and (c) are preferred, with (a) most preferred.

For example, process (c) is conveniently used to make a concentrate with a first polymer composition having a lower melting temperature, advantageously at a temperature below the decomposition temperature of the coupling agent, and the concentrate is melt blended into the propylene polymer or combination thereof optionally with other additives having a higher melting temperature to complete the coupling reaction. Concentrates are especially preferred when temperatures and/or times are sufficiently high to result in loss of coupling agent by evaporation or decomposition not leading to reaction with the polymer, or other conditions which would result in that effect. Alternatively, some coupling occurs during the blending of the first polymer and the coupling agent, but some of the coupling agent remains unreacted until the concentrate is blended into the propylene polymer composition.

However, when the coupling agent is added in a dry form it is preferred to mix the agent and polymer in a softened or molten state below the decomposition temperature of the coupling agent then to heat the resulting admixture to a temperature at least equal to the decomposition temperature of the coupling agent.

The term "melt processing" is used to mean any process in which the polymer is softened or melted, such as extrusion.

Admixing of the propylene polymer and coupling agent is conveniently accomplished by any means within the skill in the art. The propylene polymer and coupling agent are suitably combined in any manner which results in desired reaction thereof, preferably by mixing the coupling agent with the propylene polymer under conditions which allow sufficient mixing before reaction to avoid uneven amounts of localized coupling reaction then subjecting the resulting admixture to heat sufficient for reaction. Preferably, a substantially uniform admixture of coupling agent and propylene polymer is formed before exposure to conditions in which chain coupling takes place resulting in forming a molten coupled propylene polymer composition. A substantially uniform admixture is one in which the distribution of coupling agent in the propylene polymer is sufficiently homogeneous to be evidenced by a propylene polymer having a consistent molecular weight in samples taken periodically or in various samples throughout a production run or series of experiments using the same starting materials, reactants conditions and amounts after treatment according to the practice of the invention. If mixing is insufficient, variations are noted because of high molecular weights where coupling agent is concentrated and low molecular weights were there is little or no coupling agent. A beneficial effect has occurred when the Mw and Mz for foam produced according to the present invention are higher than that of the same propylene polymer which has not been treated with the coupling agent but has been subjected to the same shear and thermal history. Thus, preferably, in the practice of the present invention, decomposition of the coupling agent occurs after mixing sufficient to result in a substantially uniform admixture of coupling agent and propylene polymer. This mixing is preferably attained with the propylene polymer in a molten or melted state, that is above the glass transition temperature, or in a dissolved or finely dispersed condition rather than in a solid mass or particulate form. The molten or melted form is more preferred to insure homogeniety rather than localized concentrations at the surface.

The process of the present invention takes place in a single vessel, that is mixing of the coupling agent and propylene polymer takes place in the same vessel as heating to the decomposition temperature of the coupling agent. The vessel is preferably a twin-screw extruder, but is also advantageously a single-screw extruder, an accumulating extruder or a batch mixer. The reaction vessel more preferably has at least two zones of different temperatures into which a reaction mixture would pass, the first zone advantageously being at a temperature at least the crystalline melt temperature or the softening temperature of the propylene polymer and preferably less than the decomposition temperature of the coupling agent and the second zone being at a temperature sufficient for decomposition of the coupling agent. The first zone is preferably at a temperature sufficiently high to soften the propylene polymer and allow it to combine with the coupling agent through distributive mixing to a substantially uniform admixture.

Practice of the process of the present invention yields foams of chain coupled propylene polymers, that is the propylene polymers which have sulfonamide-coupling between different propylene polymer chains. Resulting polymers advantageously show higher molecular weight viscosity than the original propylene polymer due to coupling of long polymer chains to polymer backbones.

In the practice of this invention, foams are prepared by a means within the skill in the art advantageously characterized by admixing, preferably before introduction into or within an extruder, mixer, blender or other vessel, a propylene polymer, a coupling amount of a poly(sulfonyl azide), a blowing agent and optionally additional components such as a nucleating agent, a filler, one or more thermoplastic polymer, a stabilizer, other additives or combinations thereof. The propylene polymer admixture comprising at least the propylene polymer and the poly(sulfonyl azide) is heated to a temperature at or above its softening or melting point, hereinafter melt process temperature, to form a molten coupled propylene polymer composition. In the practice of the invention, the blowing agent is introduced before, during or after the coupling of the propylene polymer. The molten coupled propylene polymer composition comprising the blowing agent is under an elevated pressure sufficient to maintain the blowing agent in the molten coupled propylene polymer composition and prevent substantial expansion of the molten coupled propylene polymer composition. The molten coupled propylene polymer composition comprising the blowing agent is optionally cooled in the extruder or other mixing device or in separate coolers, preferably to a temperature above, more preferably equal to or greater than about 5° C. above, most preferably up to about 40° C. above, the softening point or crystallization temperature of the propylene polymer to optimize physical characteristics of the foam structure. The crystallization temperature is defined by the DSC method where melted polymer is cooled at a rate of 2° C. per minute where the exothermic peak of crystallization defines the crystallization temperature. The molten coupled propylene polymer composition comprising the blowing agent is extruded or conveyed through a die of desired shape to a second zone having a reduced or lower pressure allowing the escape of the blowing agent allowing the molten coupled polypropylene polymer/blowing agent mixture to expand forming the foam structure. After the extrudate is conveyed through the die it can further be chopped into beads. The zone of lower pressure is at a pressure lower than that in which the molten coupled propylene polymer composition comprising the blowing agent is maintained prior to extrusion through the die. The lower pressure is optionally superatmospheric or subatmospheric (evacuated or vacuum), but is preferably at an atmospheric level.

Preferably the foam produced according to the present invention has a density less than that of a foam made from the starting material polymer foamed by the same procedure but without a coupling amount of a poly(sulfonyl azide). The foam produced according to the present invention has a density equal to or greater than about 0.6 pounds per cubic foot (pcf), and preferably equal to or greater than about 1 pcf. The foam produced according to the present invention has a density less than or equal to about 50 pcf, preferably less than or equal to about 45, more preferably less than or equal to about 35 and most preferably less than or equal to about 20 pcf. Foam densities are measured according to ASTM D 1622-88.

The foam produced according to the present invention preferably has an average cell size diameter equal to or greater than about 0.1 millimeters (mm), preferably equal to or greater than about 0.3 mm and more preferably equal to or greater than about 0.5 mm. The foam according to the present invention preferably has an average cell size diameter equal to or less than about 8 mm, preferably equal to or less than 5 mm and more preferably equal to or less than 3 mm. Foam cell sizes are measured according to ASTM D3576-77.

The foam produced according to the present invention preferably retains physical properties such as crush strength as measured by (ASTM D 1621-79) or flexibility as measured by (ASTM C203) or a combination thereof as compared with that of a polymer of the same starting materials not coupled according to the practice of the invention. More preferably, by treating the polymer starting materials by the process of the invention, one can achieve at least one of greater throughput of polymer into foam (e.g., in pounds per hour) or lower density than with untreated starting material in the same foaming process while retaining of equivalent or better crush strength or flexibility or both.

The process of the present invention is particularly well suited for producing coalesced propylene foam, sometimes referred to as strand foam, as described in U.S. Pat. No. 4,824,720 and low density, elongated cellular bodies having large lateral cross-sectional areas as described in U.S. Pat. No. 4,323,528, both hereby incorporated by reference.

U.S. Pat. No. 4,824,720 describes the strand foam process. This patent describes a method for providing a closed cell foam structure comprising a plurality of coalesced extruded strands or profiles by extrusion foaming of a molten thermoplastic composition utilizing a die containing a multiplicity of orifices. The orifices are so arranged such that the contact between adjacent streams of the molten extrudate occurs during the foaming process and the contacting surfaces adhere to one another with sufficient adhesion to result in a unitary structure. The individual strands of coalesced foam should remain adhered into a unitary structure to prevent strand delamination under stresses encountered in preparing, shaping, and using the foam.

U.S. Pat. No. 4,323,528 describes an accumulating extrusion process. In this accumulating extrusion process low density, elongated cellular bodies having large lateral cross-sectional areas are prepared by: 1) forming, under pressure, a molten thermoplastic polymer comprising a blowing agent, with the mixture having a temperature at which the viscosity of the mixture is sufficient to retain the blowing agent when the mixture is allowed to expand; 2) extruding the mixture into a holding zone maintained at a temperature and pressure which does not allow the mixture to foam, the holding zone having an outlet die defining an orifice opening into a zone of lower pressure which allows for the blowing agent to escape at which the mixture foams, and an openable gate closing the die orifice; 3) periodically opening the gate; 4) substantially concurrently applying mechanical pressure by a movable ram on the mixture to eject the mixture from the holding zone through the die orifice into the zone of lower pressure, at a rate greater than that at which substantial foaming in the die orifice occurs and less than that at which substantial irregularities in cross-sectional area or shape occurs; and 5) permitting the ejected mixture to cool and expand unrestrained in at least one dimension to produce an elongated thermoplastic cellular body.

The foam produced according to the present invention optionally takes any physical configuration known in the art such as sheet or plank. The foam is particularly suited to be formed by extrusion into a plank, desirably one having a cross-sectional area of 30 square centimeters (cm) or more and a minor dimension in cross-section (thickness) preferably of 3/8 inch (0.95 cm) or more. The foam is also conveniently extruded in the form of a sheet of less than 3/8 inch (0.95 cm) cross-section thickness and a cross-sectional area of 10 square centimeters ($cm^2$) or more.

The foam produced according to the present invention is optionally closed cell or open cell. Open cell content measured according to ASTM D2856-87.

The foam produced according to the present invention is particularly suited for use in automotive interior and exterior applications for energy absorption and comfort cushioning, such as automotive headliners, door liners, and energy absorption counter measure such as bumpers. It can be used in general cushion packaging and comfort cushioning market. It can be used as thermal insulation foams for insulating tanks, trucks, and cars as well as walls and roofs in residential and commercial buildings, refrigerators, etc. It can be used as sound insulation foams in automobiles as well as in buildings.

Additionally, expanded or expandable beads can be formed that can be subsequently molded into desired shapes for any of the above applications, including impact energy management, cushion packaging, bulk dunnage packaging and the like. The beads can also be molded into panels for use in insulating applications such as for roofing, walls, tanks, and the like.

The following examples are to illustrate this invention and not limit it. Ratios, parts, and percentages are by weight unless otherwise stated.

EXAMPLES 1 TO 5

Open-cell propylene polymer foams are prepared on an 1-inch (in) (2.5 centimeters (cm)) single screw Killion extruder having feeding, metering, multiple mixing zones and a cooling zone. An opening for blowing agent is provided on the extruder barrel between the metering and mixing zones. At the end of the cooling zone, there is attached a die orifice having an opening of rectangular shape. The height of the opening, sometimes referred to as die gap, is adjustable while its width is fixed at 0.145 in (3.68 mm).

Examples 1 to 5 are a homopolymer propylene polymer resin ("PP-1") available from The Dow Chemical Company as DOW H700-12 Polypropylene Resin having a melt flow rate (per ASTM D-1238 at 230° C. under an applied load of 1.2 kg) of 12 gram per 10 minutes (g/10 min.) blended with 0.1 pph, of IRGANOX™1010 brand antioxidant available from Ciba-Geigy Corp and from 0 to 1450 ppm 4, 4'-diphenyl ether bis(sulfonyl azide) (BSA) coupling agent, IRGANOX 1010 and BSA weights are based on the weight of the propylene polymer. The propylene polymer is fed into the extruder at a uniform rate of approximately 3–5 pounds per hour (lbs/hr) (1.4–2.3 kilograms per hour (kg/hr)). As the amount of BSA is increased, the rate of propylene polymer addition is lowered to prevent it from backing up in the feed throat of the extruder. The BSA coupling agent is fed as a 3 weight percent mixture (23 weight percent BSA and 77 weight percent IRGANOX 1010) with 97 weight percent of linear propylene homopolymer powder.

The temperatures in the extruder zones are as follows: feeding zone, 175° C.; melting zone, 210° C.; metering zone, 230° C.; and mixing zone, 230° C. Isobutane blowing agent (BA) is injected under pressure into the mixing zone at a uniform rate of 0.2 lbs/hr (0.09 kg/hr). The rate is 0.086 pound-moles per one hundred pounds of the propylene polymer. The temperature of the homogeneous polymer/blowing agent mixture about to undergo foam expansion (called the foaming temperature hereinafter) is gradually reduced by adjusting the temperature of the cooling zone until the foam does not collapse. The optimum foaming temperature is about 160° C. Under these conditions, foam can not be produced without coupling agent.

The following properties were determined on the resulting foams:

"Density" is determined according to ASTM D 1622–88;

"Open cell content" is determined according to ASTM D 2856-87 and "Molecular weight" is determined by gel permeation chromatography.

Table 1 lists the foam density in pounds per cubic foot (pcf) and the foaming temperature for foams made over a range of coupling agent levels (unless otherwise noted, amount of coupling agent is given in ppm based on the weight of the propylene polymer).

TABLE 1

| Example | PP | BSA level, ppm | BA level, pph | Foaming Temperature, ° C. | Foam density, pcf |
| --- | --- | --- | --- | --- | --- |
| 1* | PP-1 | 0 | 4 | 160 | NF |
| 2 | PP-1 | 20 | 5 | 160 | 4.43 |
| 3 | PP-1 | 428 | 5.7 | 160 | 1.99 |
| 4 | PP-1 | 975 | 6.7 | 160 | 1.81 |
| 5 | PP-1 | 1450 | 6.7 | 160 | 1.4 |

*not an example of the present invention
NF = no foam

Table 2 shows the molecular weight components for PP-1 and Examples 1 to 5.

TABLE 2

| Example | $M_p$ | $M_n$ | $M_w$ | $M_z$ | $M_w/M_n$ |
|---|---|---|---|---|---|
| PP-1* | 145,000 | 45,000 | 285,000 | 746,000 | 5.89 |
| 1* | 153,000 | 50,300 | 284,000 | 874,000 | 5.63 |
| 2 | 155,000 | 48,300 | 306,000 | 967,000 | 6.33 |
| 3 | 152,000 | 53,100 | 318,000 | 974,000 | 5.99 |
| 4 | 143,000 | 50,600 | 349,000 | 1,110,000 | 6.90 |
| 5 | 140,000 | 47,900 | 346,000 | 1,100,000 | 7.23 |

*not an example of the present invention

EXAMPLES 6 TO 26

For Examples 6 to 26 a 40 mm twin screw Century, Inc., extruder having feeding, metering, multiple mixing zones and a cooling zone is used. The twin screw configuration consists of 10 heated zones. The screw has forwarding elements to advance the material and kneading block elements to aid in the melting and mixing of the propylene polymer and additives. An opening for blowing agent is provided on the extruder barrel between the metering and mixing zones. Other resins and/or additives may be feed, via a side arm feeder, to the polymer melt downstream from the main feed. At the end of the cooling zone, there is attached a die having a multiplicity of orifices which produced a stranded type propylene polymer foam.

Table 3 lists the compositions and extruder conditions for Examples 6 to 26, weights are given in pph or ppm based on the combined weight of all the polymers in the propylene polymer composition. In Table 3:

"PP-1" is a propylene homopolymer resin available from The Dow Chemical Company as DOW H700-12 Propylene Resin having a melt flow rate (per ASTM D-1238 at 230° C. and an applied load of 2.16 kg) of 12 g/10 min.;

"PP-2" is a propylene homopolymer resin available from The Dow Chemical Company as DOW H308-02Z Propylene Resin having a melt flow rate (per ASTM D-1238 at 230° C. and an applied load of 2.16 kg) of 2 g/10 min.;

"PP-3" is a propylene homopolymer resin available from The Dow Chemical Company as DOW H704-04 Propylene Resin having a melt flow rate (per ASTM D-1238 at 230° C. and an applied load of 2.16 kg) of 4 g/10 min.; and "PE-1" is a low density polyethylene available from The Dow Chemical Company as PE 6201 having a melt flow rate (per ASTM D-1238 at 190° C. and an applied load of 2.16 kg) of 2 g/10 min.

Each propylene polymer composition comprises 0.1 pph IRGANOX 1010 antioxidant, pph is based on the combined weight of all the polymers in the propylene polymer composition. Each propylene polymer composition further comprises 0.50 pph talc available from Luzenac America, Inc. under the tradename TALCUM and 0.25 pph calcium stearate available from Ferro Corporation under the tradename SYNPRO as nucleating agents, pph is based on the combined weight of all the polymers in the propylene polymer composition.

The propylene polymer compositions may comprise up to 20 percent by weight based on the combined weight of all the polymers in the propylene polymer composition of one or more additional resins, such as a second propylene polymer or a polyethylene such as LDPE. The additional resin may be added with the propylene polymer at the feed section of the extruder or down stream from the feed section to the propylene polymer melt through a side arm feeder at a point where the propylene polymer is at least partially melted and at least partially coupled.

The propylene polymer is fed into the extruder at a uniform rate of approximately 40 lbs/hr (18.2 kg/hr). The BSA coupling agent is fed as a 3 weight percent mixture (23 weight percent BSA and 77 weight percent IRGANOX 1010) with 97 weight percent of linear propylene homopolymer powder at a uniform rate of approximately 3.5 lbs/hr (1.6 kg/hr). Isobutane is used as the blowing agent and is injected under pressure into the mixing zone at a uniform rate between 2.5 to 4 lbs/hr (1.1 to 1.8 kg/hr). Unless otherwise noted, blowing agent amounts are given in pph based on the combined weight of all the polymers in the propylene polymer composition. Three different extruder zone temperature profiles are investigated:

"Condition 1": zone 1 (feed zone): unheated, zone 2 is 150° C. and temperatures are increased 10° C./zone to 220° C. at zone 9, and zones 10 and 11 are 220° C.;

"Condition 2": zone 1(feed zone): unheated, zone 2 is 150° C., zone 3 is 200° C., zones 4, 5 and 6 are 230° C., zone 7 is 220° C., zone 8 is 210° C. and zones 9 to 11 are 200° C.; and "Condition 3": zone 1(feed zone): unheated, zone 2 is 150° C., zone 3 is 200° C. and 4 to 11 are 230° C.

The foaming temperature is gradually reduced by adjusting the temperature of the zone until the foam does not collapse.

TABLE 3

| Example | PP, balance | PE-1 @ Feed Section, pph | PP-2 @ Side Arm, pph | BSA, ppm | BA, pph | Foaming Temp., ° C. | Zone Temp. | Screw, rpm |
|---|---|---|---|---|---|---|---|---|
| 6 | PP-1 | — | — | 530 | 7.5 | 158 | Cond. 1 | 200 |
| 7* | PP-1 | — | — | 0 | 6 | NF | Cond. 1 | 200 |
| 8 | PP-1 | — | — | 600 | 6 | 158 | Cond. 1 | 50 |
| 9 | PP-1 | — | — | 600 | 7.5 | 160 | Cond. 1 | 200 |
| 10 | PP-1 | — | — | 600 | 6 | 156 | Cond. 1 | 50 |
| 11 | PP-1 | — | — | 600 | 6 | 156 | Cond. 2 | 50 |
| 12 | PP-1 | — | — | 600 | 6 | 158 | Cond. 3 | 50 |
| 13 | PP-1 | 5 | — | 530 | 7.5 | 158 | Cond. 1 | 200 |
| 14 | PP-1 | 10 | — | 530 | 7.5 | 158 | Cond. 1 | 200 |
| 15 | PP-1 | — | 20 | 600 | 10 | 160 | Cond. 1 | 200 |
| 16 | PP-1 | — | 15 | 600 | 10 | 160 | Cond. 1 | 200 |
| 17 | PP-1 | — | 15 | 600 | 10 | 158 | Cond. 1 | 200 |
| 18 | PP-1 | — | 15 | 600 | 10 | 156 | Cond. 1 | 200 |
| 19 | PP-1 | — | — | 600 | 10 | 160 | Cond. 1 | 200 |

TABLE 3-continued

| Example | PP, balance | PE-1 @ Feed Section, pph | PP-2 @ Side Arm, pph | BSA, ppm | BA, pph | Foaming Temp., °C. | Zone Temp. | Screw, rpm |
|---|---|---|---|---|---|---|---|---|
| 20 | PP-1 | — | — | 600 | 10 | 158 | Cond. 1 | 200 |
| 21 | PP-1 | — | — | 600 | 10 | 156 | Cond. 1 | 200 |
| 22 | PP-3 | — | — | 430 | 15 | 164 | Cond. 1 | 200 |
| 23 | PP-3 | — | — | 430 | 15 | 162 | Cond. 1 | 200 |
| 24 | PP-3 | — | — | 430 | 15 | 160 | Cond. 1 | 200 |
| 25 | PP-3 | — | — | 430 | 15 | 158 | Cond. 1 | 200 |
| 26 | PP-2 | — | — | 430 | 15 | 160 | Cond. 1 | 200 |

*not an example of the present invention

Density, open cell content and molecular weight are determined on the resulting foam (procedure as described hereinabove). Additionally, the following property is determined:

"Cell size" is determined according to ASTM D 3576-77.

Table 4 lists the density, open cell content and cell size for Examples 6 to 26.

TABLE 4

| Example | Density, pcf | Open cell, % | Cell size, mm |
|---|---|---|---|
| 6 | 2.39 | 41 | 1.1 |
| 7* | NF | NF | NF |
| 8 | 3.73 | 67 | 1.0 |
| 9 | 6.51 | — | — |
| 10 | 3.44 | — | — |
| 11 | 5.0 | 65 | 1.0 |
| 12 | 3.73 | 67 | 1.0 |
| 13 | 2.62 | 44 | 1.3 |
| 14 | 2.69 | 43 | 1.2 |
| 15 | 2.97 | — | — |
| 16 | 2.2 | 82 | 1.0 |
| 17 | 2.2 | 76 | 1.2 |
| 18 | 2.65 | 59 | 1.1 |
| 19 | 2.1 | 69 | 1.2 |
| 20 | 1.74 | 72 | 0.9 |
| 21 | 1.7 | 57 | 0.8 |
| 22 | 1.34 | 60 | 0.6 |
| 23 | 1.34 | 47 | 0.6 |
| 24 | 1.29 | 41 | 1.2 |
| 25 | 1.28 | 69 | 1.0 |
| 26 | 1.15 | 57 | 1.1 |

*not an example of the present invention

Molecular weight data for PP-1, PP-2, PP-3 and Examples 9, 12, 16 to 26 is shown in Table 5.

TABLE 5

| Sample Name | $M_p$ | $M_n$ | $M_w$ | $M_z$ | $M_w/M_n$ |
|---|---|---|---|---|---|
| PP-1 | 145,000 | 45,000 | 265,000 | 746,000 | 5.89 |
| PP-2 | 235,000 | 70,500 | 419,000 | 1,380,000 | 5.94 |
| PP-3 | 206,000 | 66,100 | 353,000 | 1,060,000 | 5.35 |
| 9 | 145,000 | 52,400 | 339,000 | 1,110,000 | 6.47 |
| 12 | 143,000 | 49,400 | 349,000 | 1,130,000 | 7.05 |
| 16 | 138,000 | 45,000 | 322,000 | 1,090,000 | 7.16 |
| 17 | 154,000 | 49,700 | 339,000 | 1,070,000 | 6.82 |
| 18 | 151,000 | 46,800 | 330,000 | 1,080,000 | 7.06 |
| 19 | 142,000 | 50,600 | 328,000 | 1,040,000 | 6.47 |
| 20 | 132,000 | 46,700 | 317,000 | 1,020,000 | 6.79 |
| 21 | 136,000 | 50,200 | 339,000 | 1,100,000 | 6.75 |
| 22 | 182,000 | 65,800 | 402,000 | 1,220,000 | 6.10 |
| 23 | 187,000 | 49,700 | 375,000 | 1,230,000 | 7.56 |
| 24 | 187,000 | 63,500 | 398,000 | 1,220,000 | 6.26 |
| 25 | 187,000 | 65,300 | 393,000 | 1,110,000 | 6.01 |
| 26 | 253.000 | 84,700 | 477,000 | 1,500,000 | 5.62 |

From these data, it can be concluded that the process of the invention provides propylene polymer foams with a good blend of density, cell size and percent open cells.

What is claimed is:

1. A process for preparing a foam comprising the steps of:
   (i) introducing into a melt processing device:
      (a) a propylene polymer and
      (b) a coupling amount of a poly(sulfonyl azide), forming a propylene polymer admixture,
   (ii) exposing the propylene polymer admixture to a temperature sufficient to result in coupling of the propylene polymer forming a molten coupled propylene polymer composition,
   (iii) introducing a blowing agent before, during or after the coupling of the propylene polymer under a first pressure which maintains the blowing agent in the molten coupled propylene polymer composition,
   (iv) cooling the molten coupled propylene polymer composition comprising the blowing agent,
   (v) processing the molten coupled propylene polymer composition comprising the blowing agent into a zone having a second pressure which allows for the blowing agent to escape from the molten coupled propylene polymer composition and
   (vi) forming a resulting foam.

2. The process of claim 1 further comprising the step of introducing (c) an additional component selected from a thermoplastic polymer, an inorganic filler, pigments, an antioxidant, a thermal stabilizer, an acid scavenger, an ultraviolet absorber, a neutralizer, a slip agent, an antiblock agent, an antistatic agent, a clarifier, a wax, a flame retardant, a processing aid, an extrusion aid, a nucleator, or mixtures thereof, before, during or after the coupling of the propylene polymer.

3. The process of claim 1 further comprising the step of introducing a low density polyethylene, before, during or after the coupling of the propylene polymer.

4. The process of claim 1 further comprising the step of introducing talc, before, during or after the coupling of the propylene polymer.

5. The process of claim 1 wherein the coupling amount of poly(sulfonyl azide) is from about 10 parts per million to about 5 parts per hundred by weight based on the weight of the propylene polymer.

6. The process of claim 1 wherein the melt process temperature is between about 200° C. and about 255° C.

7. The process of claim 1 wherein the melt processing device is an extruder.

8. The process of claim 1 wherein the melt processing device is an accumulating extruder.

9. The process of claim 1 wherein the foam has a density of from about 0.6 to about 50 pounds per cubic foot.

10. The process of claim 1 wherein the foam has an average cell size diameter of from about 0.1 to about 8 millimeters.

11. The process of claim 1 wherein the poly(sulfonyl azide) has a structure X-R-X wherein each X is $SO_2N_3$ and R represents an unsubstituted or inertly substituted hydrocarbyl or hydrocarbyl ether; wherein the poly(sulfonyl azide) has sufficient carbon or oxygen, atoms to separate the sulfonyl azide groups sufficiently to permit a facile reaction between the propylene polymer and the sulfonyl azide.

12. The process of claim 1 wherein the poly(sulfonyl) azide is selected from 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), mixed sulfonyl azides of chlorinated aliphatic hydrocarbons containing an average of from 1 to 8 chlorine atoms and from about 2 to 5 sulfonyl azide groups per molecule, oxy-bis(4-sulfonylazidobenzene), 4,4'-bis(sulfonyl azido)biphenyl, and bis(4-sulfonyl azidophenyl) methane and mixtures thereof.

13. The process of claim 1 wherein the poly(sulfonyl) azide is 4,4'-diphenyl ether bis(sulfonyl azide).

14. The process of claim 1 wherein a substantially uniform admixture of poly(sulfonyl azide) and polymer is formed before exposure to conditions in which chain coupling takes place.

15. The process of claim 1 wherein the poly(sulfonyl azide) is introduced into the melt processing device as a concentrate in a first polymer wherein said first polymer can be the same or different from the propylene polymer (i)(a).

16. The process of claim 1 comprising the step of introducing the blowing agent and poly(sulfonyl azide) into the melt processing equipment together.

17. The process of claim 1 wherein the propylene polymer has melt flow index between about 0.1 and about 200 grams/minute at 230° C. and an applied load of 2.16 kilogram.

18. The process of claim 1 wherein the foam comprises a plurality of coalesced extruded strands.

19. The process of claim 1 further comprising the step of conveying the molten coupled propylene polymer through a die and chopping the extrudate into beads.

20. A composition comprising a foam prepared by a process of claim 1.

21. An article comprising a composition of claim 1.

22. The article of claim 21 in the form an automotive headliner, an automotive door liner, an automotive energy absorption counter measure, an automotive bumper, comfort cushioning foam, thermal insulation foam, sound insulation foam, building foam, construction foam, or packaging foam.

* * * * *